US010596537B2

(12) United States Patent
Decourcy et al.

(10) Patent No.: US 10,596,537 B2
(45) Date of Patent: Mar. 24, 2020

(54) METHOD AND SYSTEM FOR DISTRIBUTING LIQUID IN (METH)ACRYLIC MONOMER PROCESS VESSELS

(71) Applicant: Arkema France, Colombes (FR)

(72) Inventors: Michael S. Decourcy, Houston, TX (US); Christian Lacroix, Forbach (FR); Etienne Bastien, Porcelette (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 14/906,298

(22) PCT Filed: Jul. 18, 2014

(86) PCT No.: PCT/EP2014/065507
§ 371 (c)(1),
(2) Date: Jan. 20, 2016

(87) PCT Pub. No.: WO2015/011048
PCT Pub. Date: Jan. 29, 2015

(65) Prior Publication Data
US 2016/0175796 A1    Jun. 23, 2016

(30) Foreign Application Priority Data

Jul. 25, 2013    (FR) ...................................... 13 57332

(51) Int. Cl.
*B01J 4/00*    (2006.01)
(52) U.S. Cl.
CPC .................................... *B01J 4/004* (2013.01)

(58) Field of Classification Search
CPC .......... B01J 4/004; C07C 51/00; C07C 57/04; C07C 51/44; C07C 7/20; C07C 51/50;
(Continued)

(56) References Cited

U.S. PATENT DOCUMENTS 470,385 A    3/1892 Fisher
1,464,816 A    8/1923 Grace
(Continued)

FOREIGN PATENT DOCUMENTS

GB    726151    3/1955
GB    1161560    8/1969
(Continued)

*Primary Examiner* — Nadine G Norton
*Assistant Examiner* — Christopher Remavege
(74) *Attorney, Agent, or Firm* — Lynn B. Morreale

(57) ABSTRACT

A method for uniformly distributing a process liquid within a process vessel includes providing a process liquid to a fouling-resistant liquid distributor installed within a process vessel having a cross-sectional area; causing rotational movement of the fouling-resistant liquid distributor; uniformly distributing the process liquid over the cross-sectional area within the process vessel; and simultaneously self-rinsing the fouling-resistant liquid distributor with a portion of the process liquid during uniform distribution. A system is also disclosed which includes a supply of process fluid, a stationary conduit and a liquid distribution head attached to the conduit. The liquid distribution head is motive, powered by a fluid, and includes at least one process liquid delivery port. The at least one process liquid delivery port is configured to provide a +10° or greater angle of liquid coverage when the liquid distribution head is moving.

11 Claims, 4 Drawing Sheets

(58) Field of Classification Search
CPC ......... C07C 67/54; C07C 7/04; C07C 253/32;
B08B 3/02; B08B 3/04; B08B 17/00;
B08B 1/04; B05B 13/0636; B05B 7/0408;
B05B 13/0627; B05B 5/04; C08L 77/00;
C08L 71/123; C08L 71/00; Y10S 585/95;
B01D 3/32
USPC ........ 134/22, 22.1, 22.18, 166 R, 168 R, 36,
134/42; 562/414; 422/216, 217, 211;
239/550, 106; 261/97, 98; 526/75, 82,
526/83, 84, 88, 89, 317.1, 319, 320;
203/8, 9, DIG. 21
See application file for complete search history.

(56) References Cited

U.S. PATENT DOCUMENTS

| | | | |
|---|---|---|---|
| 3,079,092 A | 2/1963 | Meek | |
| 3,353,802 A | 11/1967 | Greer | |
| 3,392,967 A | 7/1968 | Eckert | |
| 3,717,553 A | 2/1973 | Otsuki et al. | |
| 3,842,055 A | 10/1974 | Gabriel et al. | |
| 3,969,447 A | 7/1976 | Glitsch et al. | |
| 4,526,656 A * | 7/1985 | Okada | B01D 3/16 202/158 |
| 4,539,396 A * | 9/1985 | Yasui | C08C 1/14 528/481 |
| 5,152,889 A * | 10/1992 | Savory | B01D 33/60 210/209 |
| 5,160,707 A * | 11/1992 | Murray | B01D 53/84 422/170 |
| 5,190,222 A * | 3/1993 | Haruch | B05B 1/267 239/523 |
| 5,232,156 A * | 8/1993 | Csordas | B05B 1/267 239/117 |
| 5,316,218 A * | 5/1994 | Bowen | B05B 13/0636 239/246 |
| 5,427,608 A * | 6/1995 | Auer | B01D 47/06 261/115 |
| 5,512,140 A * | 4/1996 | Rutan | B01D 3/163 122/390 |
| 5,807,934 A * | 9/1998 | Takahashi | B01J 19/002 526/344.2 |
| 6,355,743 B1 * | 3/2002 | Ooura | B01J 19/18 526/210 |
| 6,409,886 B1 * | 6/2002 | Matsumoto | B01D 3/148 203/49 |
| 6,652,624 B2 * | 11/2003 | Ku | B01D 47/06 95/19 |
| 6,695,928 B1 * | 2/2004 | Nakahara | C07C 51/44 134/26 |
| 6,983,578 B1 | 1/2006 | Suda et al. | |
| 7,300,555 B2 * | 11/2007 | Schroeder | C07C 51/44 203/1 |
| 7,351,310 B2 * | 4/2008 | Thiel | B01D 3/14 202/158 |
| 7,368,601 B2 * | 5/2008 | Yada | B01D 3/14 562/600 |
| 7,413,615 B2 * | 8/2008 | Yada | B01J 4/001 134/10 |
| 7,892,403 B2 * | 2/2011 | Yada | B01D 5/0078 202/182 |
| 7,968,658 B2 * | 6/2011 | Losch | C08F 2/24 526/88 |
| 8,361,238 B2 * | 1/2013 | Dorton | C11D 7/5027 134/10 |
| 8,840,714 B2 * | 9/2014 | Hakansson | F01N 3/0871 95/149 |
| 9,162,962 B2 * | 10/2015 | Schaefer | C07C 51/48 |
| 10,005,003 B1 * | 6/2018 | Littrel | B01D 3/163 |
| 2005/0119424 A1 * | 6/2005 | Ishii | B01J 4/001 526/88 |
| 2005/0139807 A1 * | 6/2005 | Tong | C08K 5/3415 252/182.12 |
| 2008/0214763 A1 * | 9/2008 | Seidl | C08F 110/10 526/237 |
| 2009/0294997 A1 * | 12/2009 | Monkelbaan | B01D 3/008 261/97 |
| 2011/0144384 A1 * | 6/2011 | Piras | B01F 5/221 562/414 |
| 2011/0308932 A1 * | 12/2011 | Tamminen | B01D 3/008 203/91 |
| 2014/0221687 A1 * | 8/2014 | Schaefer | C07C 51/48 562/600 |
| 2015/0126777 A1 * | 5/2015 | Zhang | C07C 51/44 562/598 |

FOREIGN PATENT DOCUMENTS

| | | |
|---|---|---|
| JP | 2000239228 | 2/1976 |
| JP | S5123709 | 2/1976 |
| JP | H0429701 | 1/1992 |
| JP | H10153878 | 6/1998 |

\* cited by examiner

FIGURE 4C: +180° COVERAGE

FIGURE 4B: +270° COVERAGE

FIGURE 4A: COMBINED +60° & -90° COVERAGE

METHOD AND SYSTEM FOR DISTRIBUTING LIQUID IN (METH)ACRYLIC MONOMER PROCESS VESSELS

CROSS-REFERENCE TO RELATED APPLICATIONS

This application is a national stage application under 35 U.S.C. § 371 of PCT/EP2014/065507, filed Jul. 18, 2014, which claims benefit to FR patent application FR 13.57332, filed Jul. 25, 2013.

FIELD OF THE INVENTION

The present invention relates to chemical processes and the associated processing equipment, in particular methods and process equipment for the preparation of (meth)acrylic monomer.

BACKGROUND OF THE INVENTION

In the preparation of (meth)acrylic monomers, there are many vapor-liquid contacting operations in which it is necessary to uniformly distribute a liquid stream over a large cross-sectional area within a process vessel. The majority of these process operations involve the collection or purification of (meth)acrylic monomer streams, such as for example quenching, condensing, absorbing, and distilling operations. These operations are typically performed in process vessels resembling upright cylinders, such as towers and columns. Such process vessels commonly range in diameter from about 0.3 meter (1 foot) up to about 9.2 meters (30 feet).

Liquid distribution equipment is generally located in the upper part of the process vessel above any contact-enhancing internal components that may be present. In operation, process liquid passes through the distribution equipment, is divided and broken into a series of sheets, streams, and droplets, and then flows downward through the vessel under the influence of gravity, while vapors simultaneously pass upward through the vessel. Mass and energy transfer between the liquid and vapor occurs across the surface of the liquid; process efficiency is enhanced when there is a high liquid surface area to promote contact with the vapor, such as when a large number of liquid droplets are uniformly distributed throughout the cross-section of the vessel.

Various types of liquid distribution devices include pipes, trays, troughs, rotating armatures, and spinning disks. Such devices are intended to distribute liquid flows over a large area and frequently are combined with other internal components, such as packed beds, structured packing, or distillation trays, which serve to further distribute liquid flow in an effort to maximize coverage and generate large amounts of liquid surface area. These devices include stationary distributors, such as those described in U.S. Pat. No. 3,969,447, which describes a typical piping-based distributor comprising bottom-mounted spray nozzles, and U.S. Pat. No. 3,392,967, which describes a typical trough-type distributor. Distributors are also described that revolve about a central axis by means of being mounted to a rotating shaft (U.S. Pat. Nos. 3,079,092; 1,464,816; U.S. Pat. No. 470,375; GB 1161560). Examples of such distributors are also described in GB 726151, which describes a rotating trough comprising bottom drain tubes, and U.S. Pat. No. 3,353,802, which describes a combination of a rotating distribution armature and baffles for use in vessels of rectangular cross-section. Finally, spinning disks of various configurations have also been proposed as means for distributing concentrated liquid feed streams; such devices are for example described in US Patent application No. 2011/144384, in which a Continuous Stirred Tank Reactor (CSTR) feed stream is vigorously deflected by a spinning disk mounted on the agitator shaft.

Current liquid distribution devices, however, have a disadvantage in that they provide large process-facing surfaces within the vapor spaces of (meth) acrylic monomer process vessels on which monomer vapors may condense and form polymer accumulations. The accumulation of polymeric solids is a common problem for the preparation of (meth) acrylic monomers because the foulants may interfere with the proper operation of the vessel and disturb the intended chemical processes occurring within the vessel. Eliminating the foulants may require costly cleaning operations and process downtime. In particular, the formation of condensation polymer in the vapor spaces of (meth)acrylic monomer process vessels, such as quench vessels, absorbers, contact condensers, scrubbers, heat exchangers, distillation columns, reactors, and storage tanks, is a well-known and ongoing problem. A quench vessel may also be known as a quench column, spray cooler, quench cooler, contact cooler, and quench system.

Condensation polymer forms within process vessels when (meth)acrylic monomer vapors condense on process-facing surfaces in the absence of polymerization inhibitors. Process-facing surfaces on which condensation polymer accumulations are known to occur include the top head and walls of process vessels; the interior surfaces of vessel nozzles and manways; instrumentation and emergency pressure relief devices; internal structures such as distillation trays, packing, baffles, and support structures; and even on the interior surfaces of process piping directly connected to such vessels. For example, U.S. Pat. No. 3,717,553 teaches that dry wall regions under distillation trays are prone to polymer accumulation and recommends wetting them; U.S. Pat. No. 7,892,403 teaches that the supports for stationary spray nozzles can accumulate condensation polymer & recommends placing such support members outside of the vessel; and U.S. Pat. No. 6,983,758 teaches that the presence of stationary spray nozzles and associated supply lines provides surfaces for the accumulation of condensation polymer and that low flow regions such as nozzles and manways are also prone to condensation polymer accumulations.

There are many variations of tank cleaning nozzles used to clean process vessels. A common feature of tank cleaning nozzles is the reliance on highly pressurized sprays or liquid jets to dislodge accumulated foulants through liquid impact. These devices are intended to be used intermittently, during cleaning periods when process equipment is not operating. Furthermore, any fouling-material dislodged must still be removed from the process vessel, or it will merely transfer the fouling problem to a different part of the process.

Thus, there is a need for liquid distribution equipment and/or methods which can uniformly distribute liquid over the internal cross-section of (meth)acrylic monomer process vessels while suppressing the formation of condensation polymer.

SUMMARY OF THE INVENTION

One aspect of the invention provides a method for uniformly distributing a process liquid within a process vessel, comprising;

a) providing a process liquid to a fouling-resistant liquid distributor comprising a liquid distribution head, installed within a process vessel having a cross-sectional area;
b) causing rotational movement of the fouling-resistant liquid distributor; and
c) uniformly distributing the process liquid over the cross-sectional area within the process vessel.

The method of the invention further comprises simultaneously self-rinsing the at least one fouling-resistant liquid distributor with a portion of the process liquid during step (c) and/or providing the process liquid during step (c) to a plurality of the fouling-resistant liquid distributors, wherein each of the fouling-resistant liquid distributors simultaneously rinse each other with a portion of the process liquid during step (c).

The simultaneously self-rinsing of the fouling-resistant liquid distributor with a portion of the process liquid during uniform distribution has never been disclosed nor suggested in prior art.

Another aspect of the invention, the rotational movement in step (b) is achieved by supplying at least one of a motive fluid and the process liquid to the liquid distribution head.

Yet another aspect, the process vessel is a (meth)acrylic monomer process vessel and the process liquid comprises one or more polymerization inhibitors.

Another aspect of the present invention provides a system for uniformly distributing a process liquid within a process vessel comprising a supply of process fluid, a stationary conduit, and a liquid distribution head attached to the conduit, preferably to an end of the stationary conduit. The liquid distribution head is motive, powered by a fluid, preferably by the process fluid, and comprises at least one process liquid delivery port, preferably a plurality of liquid delivery ports. The at least one process liquid delivery port is configured to provide a +10° or greater angle of liquid coverage when the liquid distribution head is moving.

Yet another aspect of the present invention provides a process vessel comprising the said system.

Yet another aspect of the present invention provides a simple and cost effective method for uniformly distributing liquid over the internal cross-section of (meth)acrylic monomer vapor-liquid contacting vessels, without accumulating condensation polymer on the distribution equipment.

Yet another aspect of the present invention provides a method for collateral wetting of process-facing surfaces within the vapor space of (meth)acrylic monomer process vessels, such as quench vessels, absorbers, contact condensers, scrubbers, heat exchangers, distillation columns, reactors, and storage tanks to further reduce the potential for polymer accumulation within process vessels.

BRIEF DESCRIPTION OF THE DRAWINGS

In order that the invention may be more fully understood, the following figures are provided by way of illustration, in which.

DETAILED DESCRIPTION OF THE INVENTION

The term "(meth)acrylic monomers," as used herein throughout the specification and the claims, includes $\alpha$, $\beta$-unsaturated carboxylic acids and esters, a group of compounds which are known to form polymer when handled in the absence of polymerization inhibitors. Such (meth)acrylic monomers are generally understood to include acrolein and methacrolein, acrylic acid, and methacrylic acid, and also the esters of acrylic acid and methacrylic acid. Specifically, the present invention relates to the preparation of one or more compounds selected from the group consisting of acrolein, acrylic acid, methyl acrylate, ethyl acrylate, butyl acrylate, 2-ethylhexyl acrylate, 2-octyl acrylate, 2-(dimethylamino) ethyl acrylate, methacrolein, methacrylic acid, methyl methacrylate, ethyl methacrylate, butyl methacrylate, and 2-(dimethylamino) ethyl methacrylate. The present invention may also be beneficially employed in the preparation of other (meth)acrylic monomers not specifically named herein, including, but not limited to, so-called "specialty" esters of acrylic acid and methacrylic acid such as those included in the product brochure, Norsocryl® SPECIALITY ACRYLIC AND METHACRYLIC MONOMERS, Arkema, April 2005.

The present invention utilizes liquid distributors which may operate continuously, whenever the process is operating, to uniformly distribute liquid throughout a process vessel. By evenly supplying an adequate liquid volume, preferably with a high droplet surface area, mass and energy transfer is enhanced in vapor-liquid contacting vessels, such as (meth)acrylic monomer collection and purification equipment. According to various embodiments of the present invention, self-rinsing of liquid distributors, as well as collateral-wetting of process-facing surfaces, occurs prior to the accumulation of polymeric solids, thereby preventing their formation.

Embodiments of the present invention may use a fouling-resistant liquid distributor comprising a stationary conduit (pipe), which may be in any orientation (e.g. horizontal, inclined, vertical), but is preferably oriented vertically within a vessel. The fouling-resistant distributor further comprises a motive fluid-powered liquid distribution head attached to said conduit, the liquid distribution head comprising at least one process liquid delivery port. The distribution head is capable of rotational movement and is attached to one end of the vertical conduit. The distribution head is preferably compact for easy installation/removal of the distributor for maintenance and inspection. A compact design also allows the distributor to be installed with a minimum of supports or internal bracing, which provides for a less complex and inexpensively installed distributor. A compact design also allows for the option to install multiple distributors within a single vessel, if desired.

Figure 3:
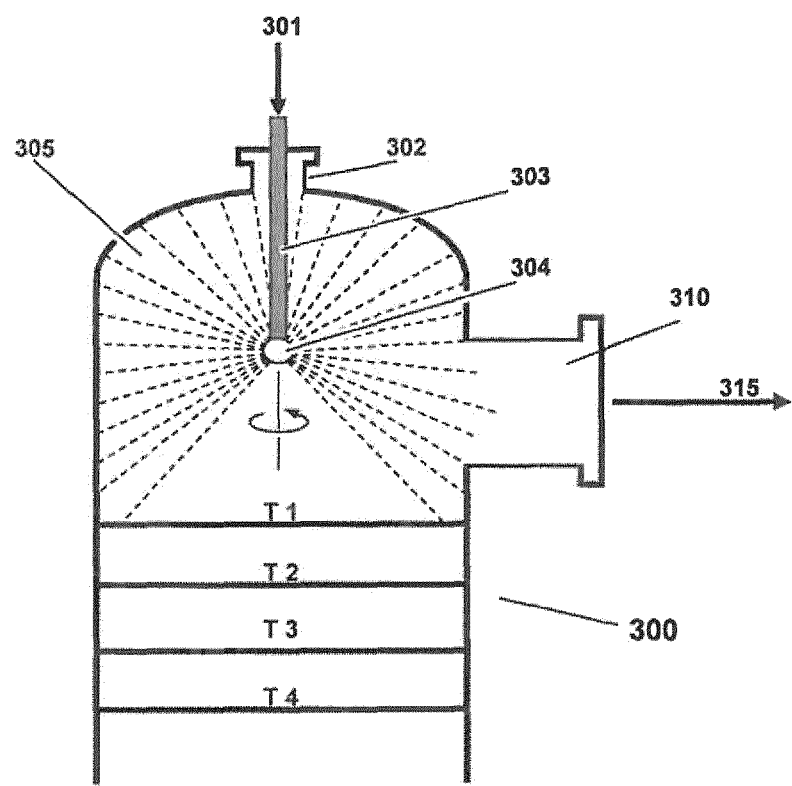
FIG. 3 shows a vapor-liquid contacting vessel incorporating another embodiment of the present invention.

In a preferred embodiment, the upper end of the vertically-oriented conduit passes through a piping nozzle on the process vessel head, and the distribution head of the fouling-resistant distributor is attached to the lower end of the vertically-oriented conduit. When a supply of process-compatible liquid is provided to the fouling-resistant liquid distributor, the process liquid flows through the conduit to the distribution head, and is discharged through one or more liquid delivery ports and into the process vessel. Referring to FIG. 3, a liquid distributor (301) according to the preferred embodiment of the present invention is illustrated having a fixed vertical conduit (303) with a compact, moving distribution head (304) attached to the lower end. It is preferred that the distribution head be small enough to pass through a circular opening not more than 30 cm (12") in diameter. The upper end of the conduit (303) passes through vessel nozzle (302) in the process vessel top head and is provided with a source of process liquid and, optionally, a source of motive fluid. As previously mentioned, the liquid distributor may be oriented horizontally (i.e., the conduit is horizontal) or at some other intermediate angle relative to the vertical plane; however, it is preferred that a vertical orientation is used.

The distribution head comprises one or more liquid delivery ports through which the liquid is discharged as a stream, a jet, or an atomized spray. The size, shape, and orientation of the liquid delivery ports, as well as variables such as the liquid supply flow rate, pressure, and viscosity, control the angle of liquid discharge, the distance that the discharged liquid travels, and any geometric coverage pattern (e.g., circular, stream, flat fan, rectangular) that the discharged liquid may create when it contacts a surface, such as the vessel wall. Examples of liquid delivery port configurations include, but are not limited to, a cylindrical hole, a port comprising a restriction orifice, a wedge-shaped slot, and a spray nozzle head. In a distribution head comprising more than one delivery port, the configuration of each port may or may not be the same.

Materials of construction for the liquid distributor (the conduit and the distributor head) may include any process-compatible materials such as metals, plastics, ceramics, composites, or combinations thereof. In one embodiment, the distributor comprises 300 series stainless steel, such as for example 304, 316, or 317 stainless steels. In another embodiment of the invention, the distributor comprises both 300 series and 400 series stainless steel components. In yet another embodiment, the distributor comprises polymer-inhibiting copper alloys, such as those described in U.S. Pat. No. 7,906,679. In another embodiment, the distributor comprises corrosion resistant materials, such as tantalum or epoxy resins.

According to an embodiment of the invention, motive fluid flows through the vertical conduit, and the distributor head, and is discharged during operation of the liquid distributor. The motive fluid may be the process liquid or it may be a separate stream (e.g., compressed air, nitrogen, water, process liquid) used only for providing driving force for movement. Motive fluid flows through the distribution head, driving continuous rotation of the distribution head about the longitudinal axis of the conduit. In a preferred embodiment, the distribution head smoothly and continuously revolves a full 360° around the conduit axis in either a clockwise or counter-clockwise directions. Various drive mechanisms known in the art, such as gears, internal turbines, or impulse paddles may be used to operate the distributor. When the process fluid is not used as the motive fluid, the motive fluid may alternatively be conveyed through means other than the conduit to the distribution head or drive mechanism.

In an alternative embodiment of the present invention, the distribution head may rotate through an arc of less than 360°, then reverse direction and return to its initial starting point; such movement would represent a continuously repeated, "cycling" form of operation which may be beneficial in some processes. Additionally, in some embodiments, the movement of the distribution head may be discontinuous, resembling the step-wise movement of a rotary-impact lawn sprinkler. In another embodiment, the liquid stream discharged from the distribution head may oscillate in a two-dimensional or even a three-dimensional wave-like pattern; such liquid discharges can be produced through the incorporation of fluidic oscillators within the distribution heads, such as those described in U.S. Pat. No. 4,151,955.

In a preferred embodiment, the motive fluid is a process liquid, and the inertial force of the process liquid discharging through the liquid delivery ports causes rotational movement of the distribution head, such that the head moves in a direction opposite to the direction of liquid discharge, i.e., discharging the process fluid causes propulsion of the distribution head. The use of process fluid as the motive fluid is preferred because movement of the distribution head is achieved without the need for a motor or a rotating shaft and associated shaft seals, thereby reducing equipment costs, the potential for process leaks through shaft seals, and maintenance issues, as well as lowering the total process-facing surface area of the distributor on which monomer might condense.

The selection of the process liquid is determined by the process in which the liquid distributor is to be used. Any liquid compatible with the process may be used. In instances where the process is a (meth)acrylic monomer process, the process liquid may comprise one or more of water, (meth)acrylic acid, (meth)acrylate esters, alcohols, solvents, absorbents, and polymerization inhibitors. In a preferred embodiment, the (meth)acrylic monomer process vessel is used in a process to produce one or more compounds selected from the group consisting of acrolein, acrylic acid, methyl acrylate, ethyl acrylate, butyl acrylate, 2-ethylhexyl acrylate, 2-octyl acrylate, 2-(dimethylamino) ethyl acrylate, methacrolein, methacrylic acid, methyl methacrylate, ethyl methacrylate, butyl methacrylate, and 2-(dimethylamino) ethyl methacrylate. As it is common to operate (meth)acrylate monomer process vessels at pressures other than atmospheric pressure (e.g. sub-atmospheric pressure), it is generally desirable to supply process liquid to the liquid distributor at a temperature below its boiling point at the operating pressure within the process vessel. In some embodiments, the process liquid is supplied to the liquid distributor at near ambient temperature (about 20° C.). In some other embodiments, the process liquid is supplied to the liquid distributor at, or even lower than, its condensation temperature. Typically, the process liquid is supplied to the liquid distributor at a temperature below its boiling point.

In a preferred embodiment, the process liquid comprises one or more polymerization inhibitors. Said inhibitors are selected from compounds that inhibit the polymerization of α-β-unsaturated compounds, such as (meth)acrylic monomers, and are provided in an amount sufficient to prevent or reduce polymerization. Suitable polymerization inhibitors include, but are not limited to, phenolic inhibitors (hydroquinone, hydroquinone methyl ether, di-tert-butyl para-cresol, etc.), phenothiazine, TEMPO nitroxyl compounds of type 4-OH or 4-oxo TEMPO, or soluble manganese or copper salts, and their mixtures.

According to one embodiment, the process vessel incorporating the present invention may be a vapor-liquid contacting vessel selected from the group consisting of a quench vessel, an absorption tower, a contact condenser, a fractionating condenser, a dehydration tower, a finishing column, a scrubber, a distillation column, and a storage tank. Alternatively, the process vessel may be an integrated process vessel comprising two or more successive process sections selected from the group consisting of a quench section, an absorption section, a partial condensation section, a scrubbing section, a packed section, a contact condensation section, a trayed section, a stripping section, and a rectification section. The process vessel may comprise one or more internal components selected from the group consisting of trays, tray supports, structured packing, random packing, feed distributors, demister pads, stationary spray nozzles, baffles, liquid distribution troughs, and side draw collection trays.

According to various embodiments of the present invention, rotation of the distribution head provides uniform liquid coverage, unlike stationary spray nozzles or liquid distributor trays and contributes to optimal heat and mass transfer for vapor-liquid contacting operations. In addition, the various embodiments of the present invention may comprise a distribution head having one or more liquid delivery ports and/or a conduit having one or more liquid delivery ports, such that the liquid distributor is self-rinsing. "Self-rinsing", as used herein throughout the specification and the claims, means discharging liquid from a liquid distributor onto the exterior surfaces of the distributor itself, thereby providing a self-rinsing action. Preferably, a self-rinsing distributor included in an embodiment of the present invention includes a distributor head with at least one delivery port configured to provide a +10° or greater angle of liquid coverage when the distributor is moving. The "angle of liquid coverage" is measured relative to the longitudinal axis of the conduit, with 0° being parallel to the conduit and 180° being perpendicular to the conduit. Positive angles signify liquid flows that are directed towards the point of attachment of the conduit to the vessel wall. Negative angles signify liquid flows directed away from the point of attachment of the conduit to the vessel wall. If the liquid distributor is not self-rinsing, it is preferred that embodiments of the present invention include a plurality of liquid distributors configured to discharge liquid onto each other, such that liquid expelled from each of the liquid distributors is able to rinse the exterior surface of another proximate liquid distributor.

Rinsing the exterior surfaces of the distributor (i.e., both the conduit and the distribution head) prevents the accumulation of condensation polymer. The rinsing action may be achieved, for example, by configuring individual distributor head ports to continually discharge liquid onto itself or an array of distributors may also be configured to rinse each other for greater reliability and more complete rinse-liquid coverage. The movement of the distribution head also causes the shedding of liquid droplets from the external surfaces of the distributor head, further reducing the tendency to accumulate foulants.

The rotational movement of the distribution head of the fouling-resistant liquid distributor also provides for collateral wetting, i.e. the distributor wets proximate process-facing surfaces in the vapor space of the vessel with a portion of the process liquid within the process vessel. Distributor movement assures uniform liquid coverage of large process-facing surface areas, such as the vessel head and walls. Generally, the wetting liquid rate resulting from collaterally-wetting the process-facing surfaces of the process vessel interior is less than 0.5 m$^3$/m$^2$-hr. According to various embodiments of the present invention, it may be possible to achieve highly efficient wetting by using a moving distributor which requires a smaller volume of rinse liquid to keep surfaces free of condensation polymer compared to previous systems.

Figure 4A:
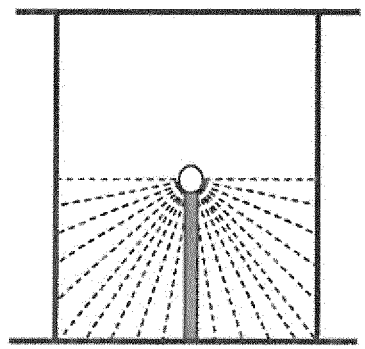
FIG. 4A 4C illustrate additional types of distributors which may be incorporated in various embodiments of the present invention.
Figure 4B:
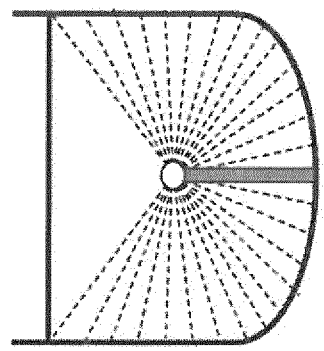
Figure 4C:
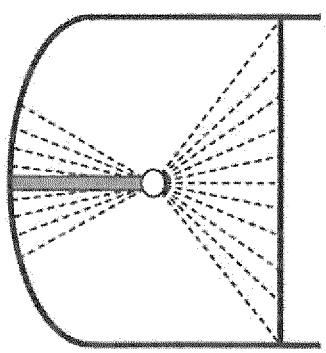

In FIGS. 2A-2G, various embodiments of distributors are shown with varying angles of liquid coverage. Embodiments 2A through 2D are self-rinsing, while embodiments 2E through 2G are not. FIGS. 4A-4C represent additional self-rinsing embodiments: 4A represents a configuration which combines two discharge ports, one of which has a +60° and another which has a −90° angle of liquid coverage; 4B represents a self-rinsing configuration in which the distribution head is at the upper end of the vertical conduit, and the angle of liquid coverage is +270°; and 4C represents a self-rinsing configuration in which the conduit is oriented horizontally and the angle of liquid coverage is +180°.

It is recognized that a distributor head mounted on a conduit having a rotating shaft may obtain some benefit with respect to a more-uniform liquid distribution within the vessel. However, if the shaft and distributor head rotate in concert, self-rinsing may be compromised if the distributor head does not include liquid delivery ports directed around the circumference of the conduit. Rotating the shaft in concert with a distributor head having an insufficient number or configuration of liquid delivery ports may create a dry zone on the surface of the conduit because an area of the surface of the conduit may not receive any liquid from upward-aimed discharge ports.

Thus, various embodiments of the present invention provide the benefit of improved mass and/or heat transfer due to uniform distribution of process liquid. Also, because the various embodiments of the invention may be self-rinsing, polymer accumulation on the distributor may be prevented, as well as process-facing vessel surfaces which receive collateral-wetting from the liquid distributor.

EXAMPLES

In order that the invention may be more fully understood, the following Examples are provided by way of illustration only.

Example 1

Figure 1:
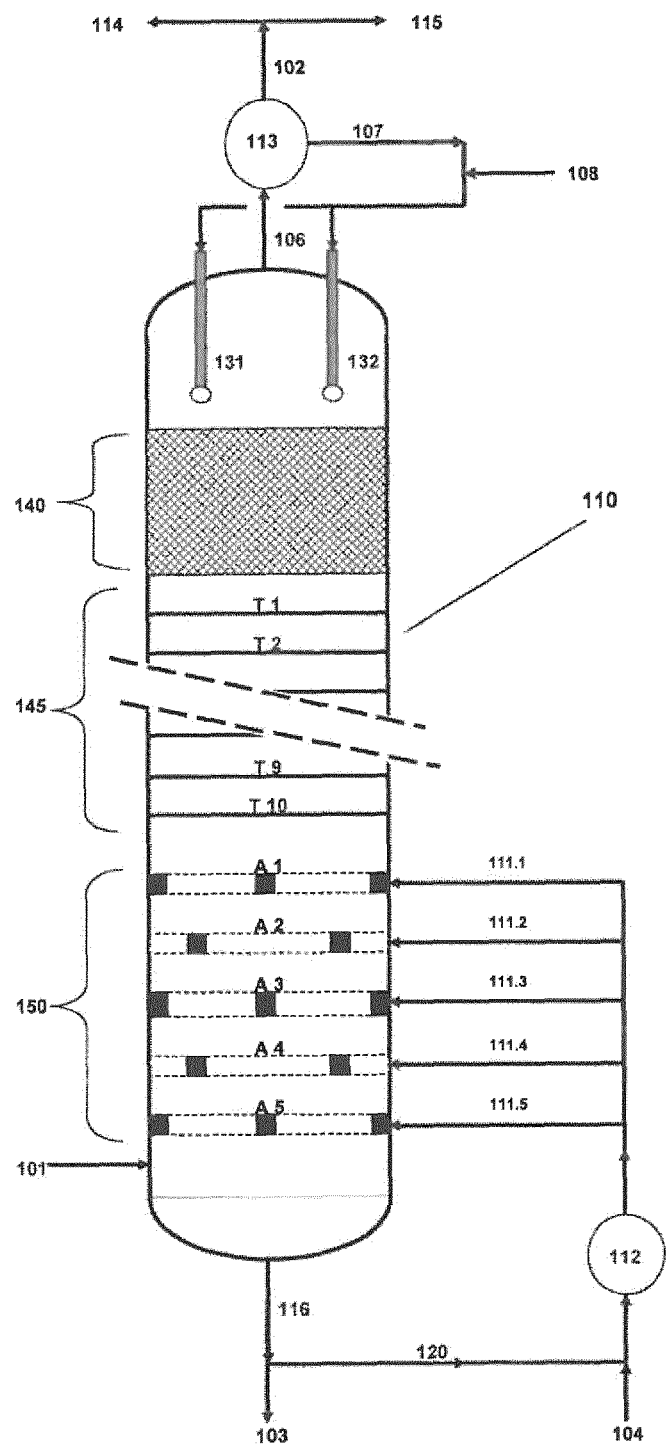
FIG. 1 illustrates a vapor-liquid contacting vessel incorporating an embodiment of the present invention.
Figure 2A:
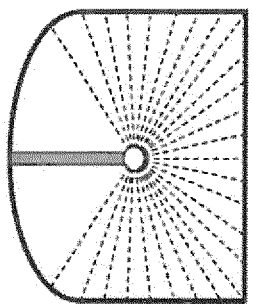
FIGS. 2A-2G depict types of distributors which may be incorporated in various embodiments of the present invention.
Figure 2B:
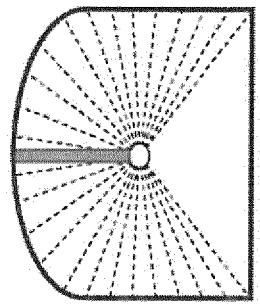
Figure 2C:
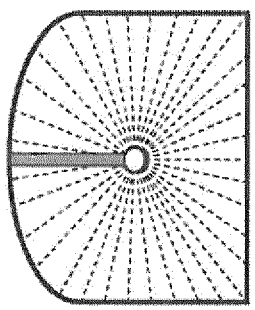
Figure 2D:
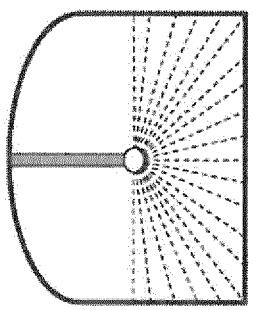
Figure 2E:
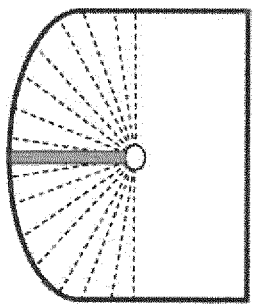
Figure 2F:
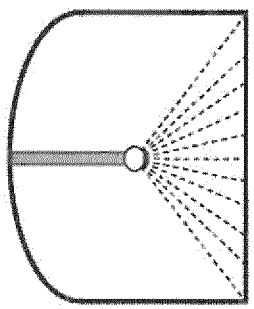
Figure 2G:
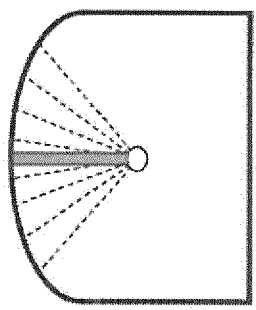

Referring to FIG. 1, a 4.3 meter (14 feet) diameter dehydration tower (110) may be used as a vapor-liquid contacting vessel. The overall height of the dehydration tower (110) may be more than 45 meters (146 feet). The dehydration tower may be part of a process for the recovery of acrylic acid, such as the process disclosed in U.S. Pat. No. 8,242,308.

The dehydration tower (110) may be configured as an integrated process vessel, meaning that the vessel comprises multiple process sections: an upper packed bed section (140), a middle trayed section (145), and a lower quench section (150). Similar processing steps could be performed in two or more successive process vessels rather than a single vessel as used in this example.

The flow rate intended for uniform distribution will be about 14,545 kg/hr (32,000 lbs/hr) of process liquid across a bed of Mellapak™ 250.Y structured packing (commercially available from Sulzer Chemtech of Pasadena, Tex. USA) occupying the entire cross-sectional area in the upper section (140) of the tower. The process liquid may be a mixture of a reflux liquid stream (107), comprising condensed lights, and an inhibitor package stream (108) comprising one or more of manganese ions, hydroquinone (HQ), 4-hydroxy TEMPO (4-HT), and phenothiazine (PTZ). The reflux liquid stream (107) may also comprise over 80 wt % water, as well as acetic acid and acrylic acid. The process liquid flows downward through the packing, coming into intimate contact with a rising vapor flow stream from the frayed section (145) comprising ten MVG™ fixed valve trays (T1 through T10) (also commercially available from Sulzer Chemtech).

The dehydration tower overhead stream (106), comprising nitrogen, water, and acetic acid, may pass through condenser (113) and form the reflux liquid stream (107) as well as a vapor stream (102). The vapor stream (102) split into recycle gas stream (114) may be recycled to a propylene oxidation reactor and vent stream (115) may be sent to one or more waste gas processing systems, such as for example a fired incinerator or a catalytic combustion unit (CCU).

Two identical fouling-resistant liquid distributors (131 & 132) may be installed in the dehydration tower (110). The distributors may be made of 316 stainless steel distribution heads attached to 3.8 cm (1.5 inch) diameter stationary conduits. Specifically, the distribution heads may be TankJet® model #18250A-316SS45 fluid-driven tank cleaning nozzles (commercially available from Spraying Systems Co., Wheaton, Ill. USA). The process liquid may serve as the motive fluid to drive continuous rotation of the distribution heads about the longitudinal axis of the stationary conduit.

Two 5 cm (2 inch) diameter flanged nozzles (not shown in the figure) may be mounted on the dehydration tower top head, one on either side of overhead vapor line (106), in positions that are about 1 meter (3.3 feet) from the vertical process vessel wall. The liquid distributors (131 & 132) may be installed through these flanged nozzles, such that they are oriented vertically, with the distribution heads located on the lower end of the conduit. This results in a spacing between the two distribution heads of about 2.3 meters (7.5 feet). The distribution heads may be positioned at the same elevation of about 1 meter (3.3 feet) above the top surface of the packing in upper packed bed (140) and about 1 meter (3.3 feet) below the highest interior point on the vessel top head.

Each of the distribution heads may include three liquid delivery ports fitted with spray nozzles and configured to provide a 360° angle of liquid coverage. When process liquid is supplied at a pressure of about 20 psi (138 kPa) and a temperature of about 138° F. (60° C.), each of the fouling-resistant liquid distributors (131, 132) may deliver approximately 120 liters per minute (32 gpm) of process liquid flow, resulting in a uniform 360° liquid distribution over a spherical spray diameter of about 2.4 m (8 ft) and self-rinsing operation. Because of the optimal vapor-liquid contacting resulting from uniform distribution of liquid droplets over the packing, the acrylic acid content of the overhead vapor stream (106) may be beneficially minimized, thus providing an opportunity to reduce processing costs. Additionally, the uniform liquid distribution may limit the occurrence of dry regions within the packed bed, thereby preventing polymer accumulations on the packing.

From Example 1, it is clear that the uniform liquid coverage provided by the inventive distribution method may provide the potential for efficient mass and energy transfer within the packed section of the dehydration tower, while simultaneously avoiding polymer buildup on the distributors, the packing, and the process-facing surfaces of the dehydration tower head and walls.

As recognized by one of ordinary skill, Example 1 demonstrates that the liquid distributor could be beneficially employed within a (meth)acrylic acid absorber in which an absorbent is instead utilized as the process liquid. It is fully expected that process liquids comprising water, or even organics such as high boiling solvents like, for example, diphenyl ether or toluene, could be effectively utilized as absorbents and uniformly distributed according to an embodiment of the present invention.

Example 2

A similar vapor-liquid contacting vessel as used in Example 1 may be used in Example 2. The applicability of the present invention to a process for the recovery of acrylic acid may be applied in the cylindrical space generally defining quench section (150). The quench section (150) may have an internal vessel diameter "$D_v$" of 4.3 meters (14 feet) and a height of about 20 meters tall (65 feet). The quench section (150) would not comprise any internal trays or packing to promote vapor-liquid contact. Instead, a plurality of fouling resistant liquid distributors may be used to provide uniform liquid distribution within the quench section (150) resulting in intimate vapor-liquid contact (for optimal mass and heat transfer), as well as self-rinsing of the distributors and collateral wetting of the vessel walls for the avoidance of polymer accumulation. The fouling resistant liquid distributors may be installed in a series of five distribution arrays (A1, A2, A3, A4, A5), with each distribution array being placed at a specific elevation along the vessel wall.

Each distribution array may comprise five horizontally-oriented distributors, removably attached to the vessel wall, for a total of twenty-five installed distributors. Within each distribution array, the five distributors may be evenly spaced at 72° intervals along the circumference of the vessel wall and positioned geometrically Normal to the interior surface of the wall. The distributors within successive arrays may be vertically offset in order to create a staggered arrangement down the wall; for example, the distributors in array A1 would not align vertically with those of array A2. Each successive array would be offset by 36° relative to the previous array.

Although not required, each distributor in each array may be identical in design and comprise a 15.3 cm (6 inch) long conduit section, to which a 3.8 cm (1.5") model HWS-50 Hydrowhirl S® slotted spray nozzle (commercially available from BETE Fog Nozzle, Inc. of Greenfield, Mass., USA) is attached. Distributors having Teflon® components should be avoided.

Process liquid flow to each distributor may be controlled such that 278 liters/minute (74 gpm) is provided to each of the twenty-five distributors. At a supply pressure of 40 psi (276 kPa), this flow of process liquid discharging from the distribution heads may cause the distributors to revolve about the longitudinal axis of the horizontal conduit to which they are mounted, thereby achieving a 360° liquid coverage angle over a spherical spray diameter ($D_s$) of about 5.5 m (18 ft).

The $D_s$ at a given process liquid flow rate may be determined empirically by direct observation or, in the case of commercially available nozzles, such data may be obtained from the manufacturer. It is preferred that horizontally-oriented distributors in accordance with the present method be selected and operated in a manner that conforms to the relationship:

$$D_v \leq D_s.$$

In Example 2, the five distribution arrays (A1, A2, A3, A4, A5) may be placed within the quench section (150) with a 2.75 m (9 ft) vertical distance ("H") between each successive level. It is not necessary for the vertical distance between successive arrays to be constant. In general, it is preferred that the spacing between successive distribution arrays conforms to the relationship:

$$H \leq D_s/2.$$

Additionally, in embodiments such as Example 2 in which distributors within a distribution array may be placed at regular intervals along the circumference of the vessel wall, it is preferred that the number of distributors (N) in a distribution array conforms to the relationship:

$6.28 \times (D_v/D_s) \leq N$, where $N$ is a positive integer.

The uppermost array (A1) may be positioned about 2.75 meters below the bottom-most tray (T10) of trayed section (145) and the bottom-most array (A5) may be at least 3 meters above the centerline of reaction gas line (101).

During operation, over 95,450 kg/hr (210,000 lbs/hr) of a gaseous reaction mixture from the outlet of a propylene oxidation reactor may enter the dehydration tower via a reaction gas line (101) at a temperature of about 182° C. (360° F.). Bottoms liquid (116) is drawn from the dehydration tower (110). A portion of this stream may be transferred to a finishing column (not shown) via line (103), with the remainder going to heat exchanger (112) via recirculation line (120). Condensed liquid stream (104) may also return from the finishing column (not shown) via line (104).

Acrylic acid containing quench liquid may serve as both the process liquid and the motive fluid for the distributors. A total process liquid flow of about 376,460 kg/hr (828,210 lbs/hr) may exit exchanger 112 at a temperature of about 100° C. (212° F.) and flow through each of the lines in the return piping network (111.1, 111.2, 111.3, 111.4, and 111.5) to supply each of the distributor arrays. The lines within this return piping network may optionally include one or more ancillary components, including but not limited to flow measurement devices, temperature measurement devices, pressure measurement devices, flow control valves, restriction orifice plates, heat exchangers, and filters. The presence of such optional ancillary components may allow process liquid flow rates to be varied from one array to the next, or even allow the temperature of the process liquid supplied to distribution arrays higher in the dehydration tower to be cooler than that supplied to the arrays lower in the tower.

By way of this configuration, a copious quantity of liquid droplets may be broadly and uniformly distributed throughout quench section (150), and these droplets intimately contact the crude acrylic acid vapor, achieving excellent mass and energy transfer within the quench section. Each of the distributors may be thoroughly self-rinsed, and the bottom of tray T10 may also be collaterally wetted by the distributors in array A1. As a result, the quenching step may be efficiently performed without the accumulation of fouling polymer solids.

As understood by one of ordinary skill in the art, the use of the present invention in a quench section does not require that the quench section be part of an integrated process vessel. Operation of the quench section, as well as the present invention, will not materially change if performed in a separate process vessel immediately upstream of an alternative dehydration tower, such as the arrangement described in FIG. 2 of U.S. Pat. No. 8,242,308.

Example 3

Referring to FIG. 3, the vapor-liquid contacting vessel in Example 3 was a 2.75 meter diameter Glacial Acrylic Acid distillation column (300). Process gases (315) passed out of the column via an overhead vapor line (310), which was mounted to the side of the column top head. The column comprised a plurality of dual-flow trays (generally represented as T1, T2, T3, T4) on which intimate vapor-liquid contact occurred.

To uniformly distribute a process liquid stream comprising acrylic acid and about 200 ppm MeHQ polymerization inhibitor (herein referred to as "GAA Inhibitor Solution") onto the top tray (T1) of the distillation column, as well as prevent accumulation of condensation polymer on the process-facing surfaces of the distillation column top head or the portion of the vessel walls located in the vapor space above the top tray (a total surface area of about 30 m² (317 square feet)), a fouling-resistant liquid distributor comprising a single, spherical distribution head (304) with a plurality of liquid delivery ports was used. This specific distribution head was a 316 stainless steel model #566.968.17.BL nozzle, commercially available from Lechler GmbH of Metzingen, Germany. This distribution head was attached to the lower end of a stationary 19 mm (¾ inch) diameter conduit (303) via a NPT connection. The fouling-resistant liquid distributor (301) was inserted through a standard 5 cm (2 inch) flanged vessel nozzle (302), located on the top center of the distillation column head, and sealed in place using a standard bolted connection (not shown).

Conduit (303) was of sufficient length to allow positioning of the distribution head below the top tangent line of the column, within about 1 meter of the top interior surface of the column head. GAA Inhibitor Solution was supplied at a rate of 1,600 kg/hr (3,520 lbs/hr) to the upper end of the conduit (303) and flowed downward through the conduit to the interior of the spherical distribution head (304). In this way, the flowing inhibitor solution served as the motive fluid for the distributor, causing the distribution head to revolve continuously about the centerline axis of the conduit (generally indicated in the figure by the circular arrow). When in motion, the distribution head discharged sufficient liquid GAA Inhibitor Solution to provide uniform coverage over a +300° angle of liquid coverage (305), uniformly distributing inhibitor solution over the entire circumference of the top tray of the column, continually wetting all of the interior surfaces within the vapor space above the top tray of the column at a wetting liquid rate of 0.05 m³/m²-hr, and simultaneously self-rinsing the exterior surfaces of the conduit and distribution head. In this way, the trays (T1, T2, T3, . . . ) and process-facing interior surfaces of the column were reliably protected against polymer accumulation despite operation in (meth)acrylic monomer process service.

Subsequent inspection of the distillation column after one year of continuous operation verified that there was no polymer present in the top of the column. This demonstrates that the inventive distribution method employed in this embodiment is highly effective at preventing polymer accumulation at the top of the distillation column. Further, given that the low wetting liquid rate which was employed provided satisfactory results (for example, the wetting liquid rate used in Example 3 was one-tenth the minimum wetting liquid rate taught in U.S. Pat. No. 6,409,886), various embodiments of the present invention may provide improved uniform liquid distribution over the previously used process utilizing stationary spray-nozzles.

Example 4

In Example 4, the single fouling resistant liquid distributor of Example 3 was retrofit to an existing dual-use acrylic ester distillation column that may be employed to produce butyl acrylate or 2-ethylhexyl acrylate. The acrylate ester distillation column had a 1.96 meter (6.37 feet) diameter and included a plurality of trays on which intimate vapor-liquid contact occurred. The fouling resistant liquid distributor was used to uniformly distribute a process liquid stream comprising polymerization inhibitor (herein referred to as "Ester Process Inhibitor Solution") onto the top tray of the distillation column, as well as prevent accumulation of condensation polymer on the process-facing surfaces of the distillation column dome (or top head), as well as the portion of the vessel walls located in the vapor space above the top tray, a total surface area of about 14 m$^2$ (148 square feet).

Configuration of the system of Example 4 was similar to Example 3. The fouling resistant liquid distribution head was attached to the lower end of a stationary 19 mm (¾ inch) diameter conduit via an NPT connection. The upper end of the conduit was screwed into a threaded connection on a standard DN100 (4 inch) flange. The fouling resistant liquid distributor was then inserted through a standard 100 mm (4 inch) flanged vessel nozzle located on the top center of the distillation column head, and the DN100 flange was sealed in place using a standard bolted connection. The vessel nozzle had an overall length of 0.565 meter (22 inches), which created a stagnant annular nozzle space between the internal surface of the vessel nozzle and the exterior surface of the stationary conduit. Two optional "conduit ports" were added to the upper end of the conduit within about 50 mm of the DN100 flange. These conduit ports were positioned on opposite sides of the conduit and were oriented perpendicular to the centerline axis of the conduit to direct a portion of the ester process inhibitor solution radially outward onto the interior surface of the vessel nozzle. Such optional conduit ports may range in diameter from about 1 mm to about 10 mm (0.04 to 0.39 inch), dependent on variables such as the total number of ports, the diameter of the stationary conduit, and the available process fluid supply pressure, and selection of the specific number and diameter(s) of optional conduit port(s) is easily determined by one of ordinary skill in the art. The use of optional conduit ports serves to prevent the accumulation of foulants within the annular nozzle space.

In Example 4, the conduit was of sufficient length to allow positioning of the fouling resistant liquid distribution head within about 0.6 meter (2 feet) of the top interior surface of the column head. Ester Process Inhibitor Solution was supplied at a rate of about 2,000 kg/hr (4,400 lbs/hr) to the upper end of the conduit and flowed downward through the conduit to the interior of the spherical distribution head. In this way, the flowing inhibitor solution served as the motive fluid for the distributor, causing the distribution head to revolve continuously about the centerline axis of the conduit. When in motion, the distribution head discharged sufficient liquid inhibitor solution to provide uniform coverage over a +300° angle of liquid coverage, uniformly distributing inhibitor solution over the entire circumference of the top tray of the column and continually wetting all of the interior surfaces within the vapor space above the top tray of the column at a wetting liquid rate of about 0.08 m$^3$/m$^2$-hr. Operation of the fouling resistant liquid distributor comprising optional conduit ports also rinsed the annular nozzle space and simultaneously self-rinsed the exterior surfaces of the conduit and distribution head. The trays, the vessel nozzle, and the process-facing interior surfaces of the column were reliably protected against polymer accumulation despite operation in (meth)acrylic monomer process service. Subsequent inspection of the ester process distillation column after extended periods of continuous operation producing butyl acrylate or 2-ethylhexyl acrylate verified that the fouling resistant liquid distributor was effective at preventing the accumulation of polymer in the top of the column.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

The invention claimed is:

1. A method for uniformly and continuously distributing a process liquid over an internal cross-section of a (meth) acrylic monomer vapor-liquid contacting process vessel to suppress formation of condensation polymer, said method comprising:
   a. providing a process liquid to at least two fouling-resistant liquid distributors comprising a liquid distribution head, installed within said (meth)acrylic monomer vapor-liquid contacting process vessel having a cross-sectional area, said process liquid comprising one or more polymerization inhibitors;
   b. causing rotational movement of the fouling-resistant liquid distributors;
   c. while said method is in operation, uniformly and continuously distributing and discharging the process liquid from said liquid distributor over the cross-sectional area within the (meth)acrylic monomer vapor-liquid contacting process vessel; and
   d. simultaneously self-rinsing the at least two fouling-resistant liquid distributors with a portion of the process liquid during step (c), whereby the discharged liquid is discharged onto the exterior surfaces of said distributor, wherein each of the at least two fouling-resistant liquid distributors simultaneously rinses each other with a portion of the process liquid during step (c).

2. The method of claim 1, wherein said at least two fouling-resistant liquid distributors comprises:
   a. a stationary conduit, and
   b. a motive fluid-powered liquid distribution head attached to said conduit,
   wherein at least one of said stationary conduit and said liquid distribution head comprises at least one process liquid delivery port.

3. The method of claim 1, wherein causing the rotational movement in step (b) is achieved by supplying at least one of motive fluid and the process liquid to the liquid distribution head.

4. The method of claim 1 further comprising collaterally-wetting process-facing surfaces within the (meth)acrylic monomer vapor-liquid contacting process vessel with a portion of the process liquid.

5. The method of claim 4, wherein the wetting liquid rate resulting from collaterally-wetting the process-facing surfaces of the (meth)acrylic monomer vapor-liquid contacting process vessel interior is less than 0.5 m$^3$/m$^2$-hr.

6. The method of claim 1, wherein the (meth)acrylic monomer vapor-liquid contacting process vessel is used in a process to produce one or more compounds selected from the group consisting of acrolein, acrylic acid, methyl acrylate, ethyl acrylate, butyl acrylate, 2-ethylhexyl acrylate, 2-octyl acrylate, 2-(dimethylamino) ethyl acrylate, methacrolein, methacrylic acid, methyl methacrylate, ethyl methacrylate, butyl methacrylate, and 2-(dimethylamino) ethyl methacrylate.

7. The method of claim 1, wherein the (meth)acrylic monomer process vessel is a vapor-liquid contacting vessel selected from the group consisting of a quench vessel, an absorption tower, a contact condenser, a fractionating condenser, a dehydration tower, a finishing column, a scrubber, a distillation column, and a storage tank.

8. The method of claim 1, wherein the (meth)acrylic monomer vapor-liquid contacting process vessel is an integrated process vessel comprising two or more successive process sections selected from the group consisting of a quench section, an absorption section, a partial condensation section, a scrubbing section, a packed section, a contact condensation section, a trayed section, a stripping section, and a rectification section.

9. The method of claim 1, wherein the (meth)acrylic monomer vapor-liquid contacting process vessel comprises one or more internal components selected from the group consisting of trays, tray supports, structured packing, random packing, feed distributors, demister pads, stationary spray nozzles, baffles, liquid distribution troughs, and side draw collection trays.

10. A system for uniformly distributing a process liquid within a (meth)acrylic monomer vapor-liquid contacting process vessel while suppressing formation of condensation polymer according to the method of claim 1, comprising:
   a. a supply of process fluid comprising one or more polymerization inhibitors,
   b. a stationary conduit, and
   c. a liquid distribution head attached to said conduit, wherein said liquid distribution head is motive, powered by a fluid, and comprises at least one process liquid delivery port, and wherein the at least one process liquid delivery port is configured to provide a +10° or greater angle of liquid coverage of the process fluid when the liquid distribution head is moving.

11. The method of claim 1, wherein the (meth)acrylic monomer vapor-liquid contacting process vessel is a dehydration tower that is part of a process for the recovery of acrylic acid.

\* \* \* \* \*